(12) United States Patent
Liu et al.

(10) Patent No.: US 11,309,932 B1
(45) Date of Patent: Apr. 19, 2022

(54) RECEIVER-TRANSMITTER IMPEDANCE CO-MATCHING METHOD USING BONDWIRES

(71) Applicant: InPlay, Inc., Irvine, CA (US)

(72) Inventors: Ruifeng Liu, Irvine, CA (US); Russell Mohn, Santa Ana, CA (US)

(73) Assignee: INPLAY, INC., Irvine, CA (US)

( * ) Notice: Subject to any disclaimer, the term of this patent is extended or adjusted under 35 U.S.C. 154(b) by 0 days.

(21) Appl. No.: 17/303,265

(22) Filed: May 25, 2021

(51) Int. Cl.
*H04B 1/405* (2015.01)
*H04B 1/3805* (2015.01)
*H04B 1/04* (2006.01)

(52) U.S. Cl.
CPC .......... *H04B 1/405* (2013.01); *H04B 1/0458* (2013.01); *H04B 1/3805* (2013.01); *H04B 2001/3811* (2013.01)

(58) Field of Classification Search
CPC .... H04B 1/405; H04B 1/0458; H04B 1/3805; H04B 2001/3811
See application file for complete search history.

(56) References Cited

U.S. PATENT DOCUMENTS

| | | | | |
|---|---|---|---|---|
| 11,088,719 | B1* | 8/2021 | Liu | H02H 9/045 |
| 2011/0285475 | A1* | 11/2011 | Lu | H04B 1/48 |
| | | | | 333/104 |
| 2013/0252562 | A1* | 9/2013 | Hasson | H04B 1/44 |
| | | | | 455/78 |

* cited by examiner

*Primary Examiner* — Nguyen T Vo
(74) *Attorney, Agent, or Firm* — Innovation Capital Law Group, LLP; Vic Lin

(57) ABSTRACT

Semiconductor chips are made increasingly smaller, thanks to improved design techniques and process scaling. Sometimes the bottleneck is not the chip itself but the package size due to many necessary pins. To help reduce the number of package pins, the chip should use less pins by sharing or reusing pins if possible. Therefore, single-ended RF input/output is used for transceiver, and the same pin is shared between RX and TX. A receiver (RX)-transmitter (TX) impedance co-matching method uses multiple bondwires for transceivers sharing one input/output (I/O) pin between RX and TX. The RX input impedance and TX output impedance are transformed closer to each other or even to the same impedance, which makes it possible to get the best RX and TX performance with just one matching network. The chip area is also saved without using on-chip inductors.

18 Claims, 4 Drawing Sheets

RECEIVER-TRANSMITTER IMPEDANCE CO-MATCHING METHOD USING BONDWIRES

BACKGROUND OF THE INVENTION

1. Field of the Invention

Embodiments of the invention relate generally to radio frequency (RF) communication methods. More particularly, embodiments of the invention relate to a receiver-transmitter (RX-TX) impedance co-matching method using multiple bondwires for transceivers sharing one I/O pin between RX and TX.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Miniaturization of electronic devices has always been a developing trend to save cost and integrate more features. Semiconductor chips are made increasingly smaller, thanks to improved design techniques and process scaling. Sometimes, the bottleneck is not the chip itself, but the package size due to many necessary pins. To help reduce the number of package pins, the chip should use less pins by sharing or reusing pins if possible. Unfortunately, the optimum impedance for RX is often different from that of TX. If simply shorting the RX input and TX output, one cannot get the best performance of RX and TX simultaneously.

FIGS. 1 and 2 illustrate the RX input and TX output impedance of a short range wireless transceiver, such as a Bluetooth® low energy(BLE) transceiver. As can be seen in FIG. 2, the RX impedance is relatively far from the TX impedance.

Referring to FIGS. 3 and 4, two components can be inserted between the radio frequency input-output (RFIO) 100 and the RX 102 to move the RX impedance closer to the TX impedance: a shunt cap 104 from RX input to ground and a series inductor 106 between the RFIO 100 and the RX input 108. As shown in FIG. 4, the RX input impedance moves very close to TX output impedance, where the inductor is 3 nH and the cap is 0.3 pF. Thus, the optimum RX and optimum TX performance can be achieved with one matching network between the RFIO and the antenna.

In view of the foregoing, there is a need for an improved method for matching a receiver impedance with a transmitter impedance in an architecture where the transmitter and receiver can share the same package pin.

SUMMARY OF THE INVENTION

Embodiments of the present invention provide a method for minimizing a difference between a transmitter impedance and a receiver impedance in a wireless communication transceiver comprising interconnecting a receiver connection from a transceiver with a package pin of a chip with a receiver bondwire; and interconnecting a transmitter connection from the transceiver to the package pin of the chip with a plurality of transmitter bondwires, each of the transmitter bondwires disposed in parallel with each other.

Embodiments of the present invention further provide a method for minimizing a difference between a transmitter impedance and a receiver impedance in a wireless communication transceiver comprising interconnecting a receiver connection from a transceiver with a package pin of a chip with a receiver bondwire; and interconnecting a transmitter connection from the transceiver to the package pin of the chip with a transmitter bondwire, wherein an inductance of the receiver bondwire is greater than an inductance of the transmitter bondwire; and the chip is free of inductors used for impedance matching.

Embodiments of the present invention also provide a method for improving a performance of a receiver and a transmitter of a transceiver in a wireless communication device comprising reducing a difference in a transmitter impedance and a receiver impedance by: interconnecting a receiver connection from the transceiver with a package pin of a chip with a receiver bondwire; and interconnecting a transmitter connection from the transceiver to the package pin of the chip with a plurality of transmitter bondwires, connected in parallel, wherein an inductance of the receiver bondwire is greater than an inductance of the transmitter bondwire, and the chip is free of inductors used for impedance matching.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
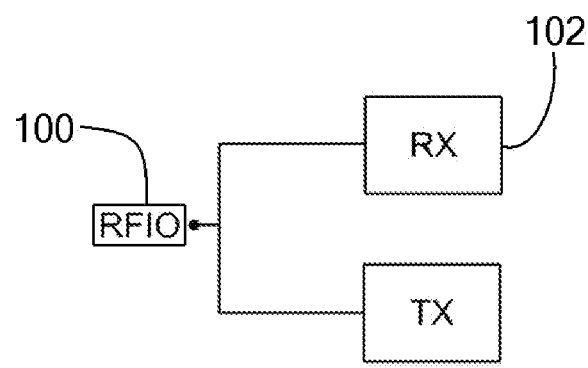
FIG. 1 illustrates a conventional BLE transmitter, receiver, and RFIO arrangement according to the prior art.
Figure 2:
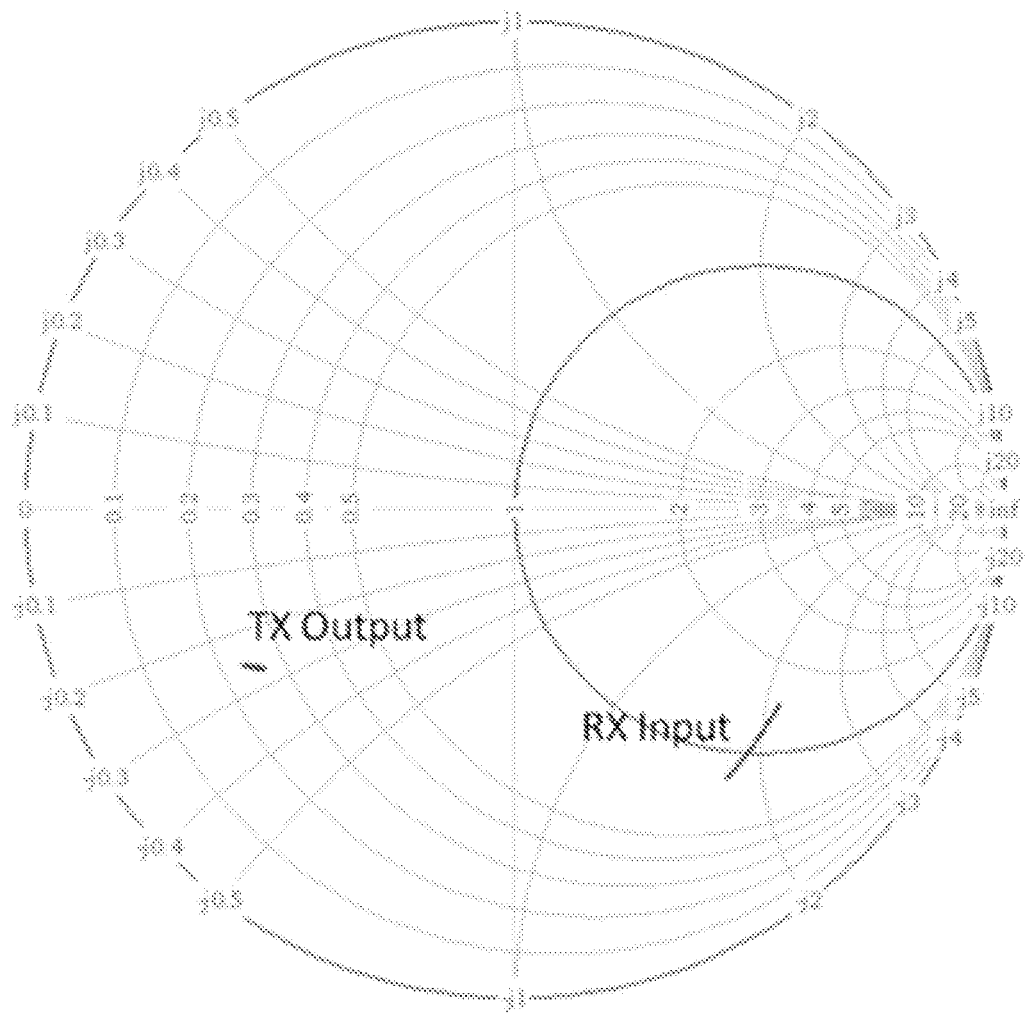
FIG. 2 illustrates a Smith chart showing the receiver impedance and the transmitter impedance in the system of FIG. 1.
Figure 3:
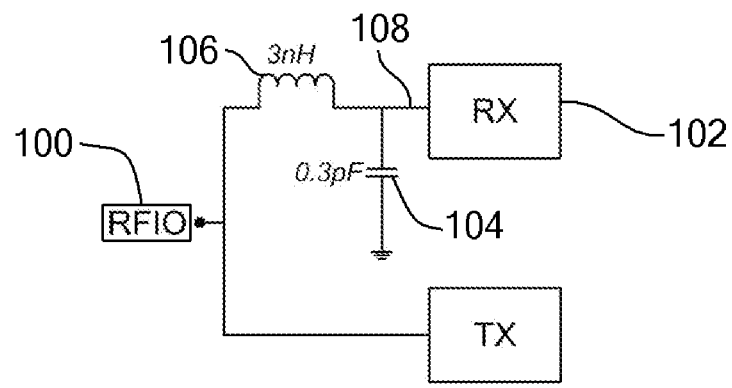
FIG. 3 illustrates a modified RX-TX arrangement using an inductor and capacitor to bring the RX impedance closer to the TX impedance.
Figure 4:
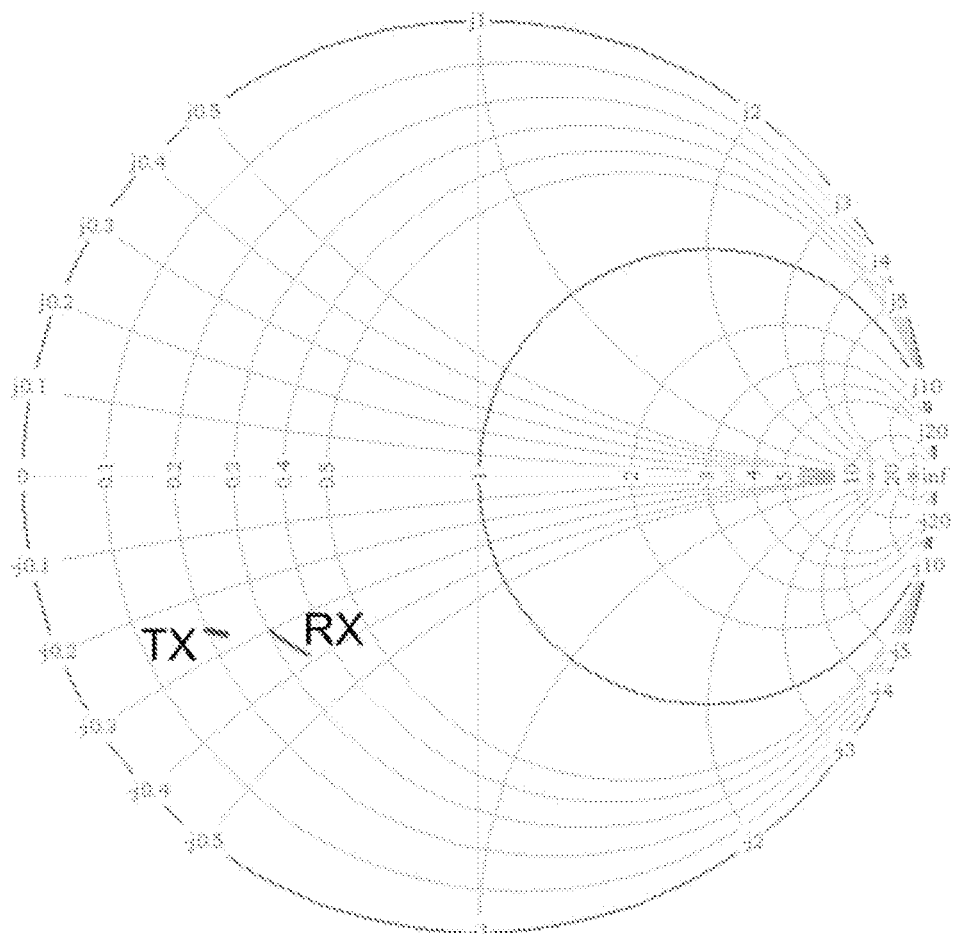
FIG. 4 illustrates a Smith chart showing the RX impedance and the TX impedance in the system of FIG. 3.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a receiver (RX)-transmitter (TX) impedance co-matching method using multiple bondwires for transceivers sharing one input/output (I/O) pin between RX and TX. The RX input impedance and TX output impedance are transformed closer to each other or even to the same impedance, which makes it possible to get the best RX and TX performance with just one matching network. The chip area is also saved without using on-chip inductors.

Figure 5:
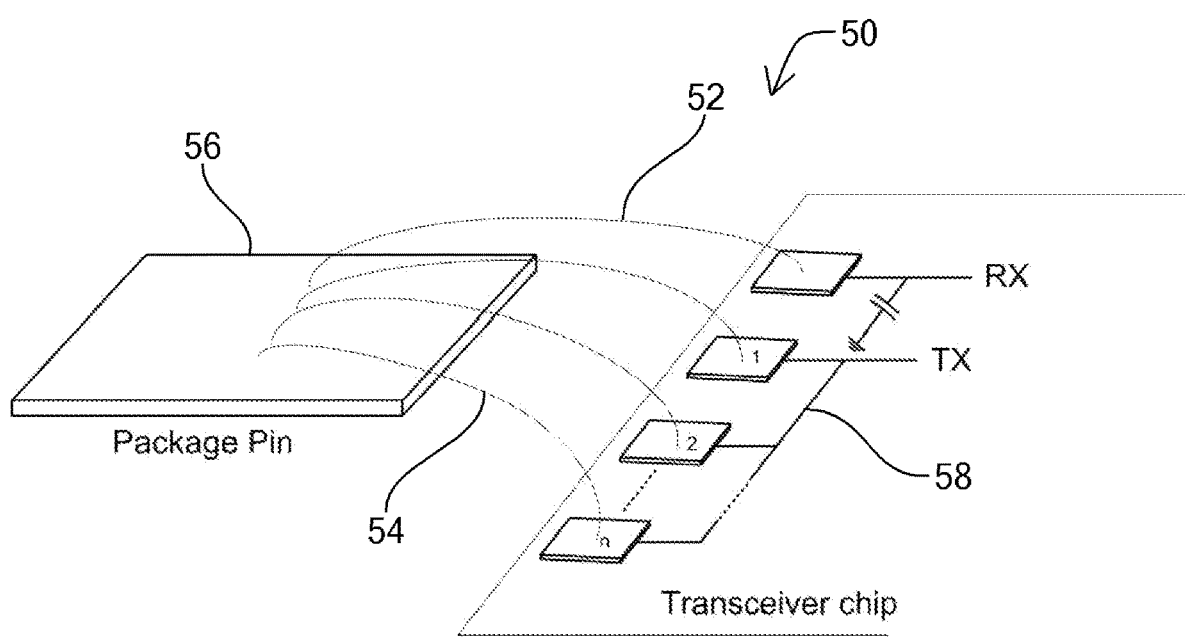
FIG. 5 illustrates an architecture for bringing the RX impedance closer to the TX impedance according to an exemplary embodiment of the present invention.

Referring to FIG. 5, a method 50 is shown to minimize the impedance difference between the RX and TX using multiple bondwires. One bondwire 52 can be used to connect the RX input to the package pin 56. A plurality of bondwires, such as n bondwires 54, in parallel, can be used to connect the TX output 58 to the same package pin 56.

Assuming the inductance of one bondwire is $L_{bw}$, the inductance difference between RX and TX can be calculated as $L_{bw} - L_{bw}/n = (n-1)/n * L_{bw}$, where n is the number of bondwires connecting the TX output to the package pin. Thus, the RX input and the TX output can use the same package pin, reducing the number of necessary chip pins. Further, the required chip area is reduced because the need for an on-chip inductor is eliminated.

Figure 6:
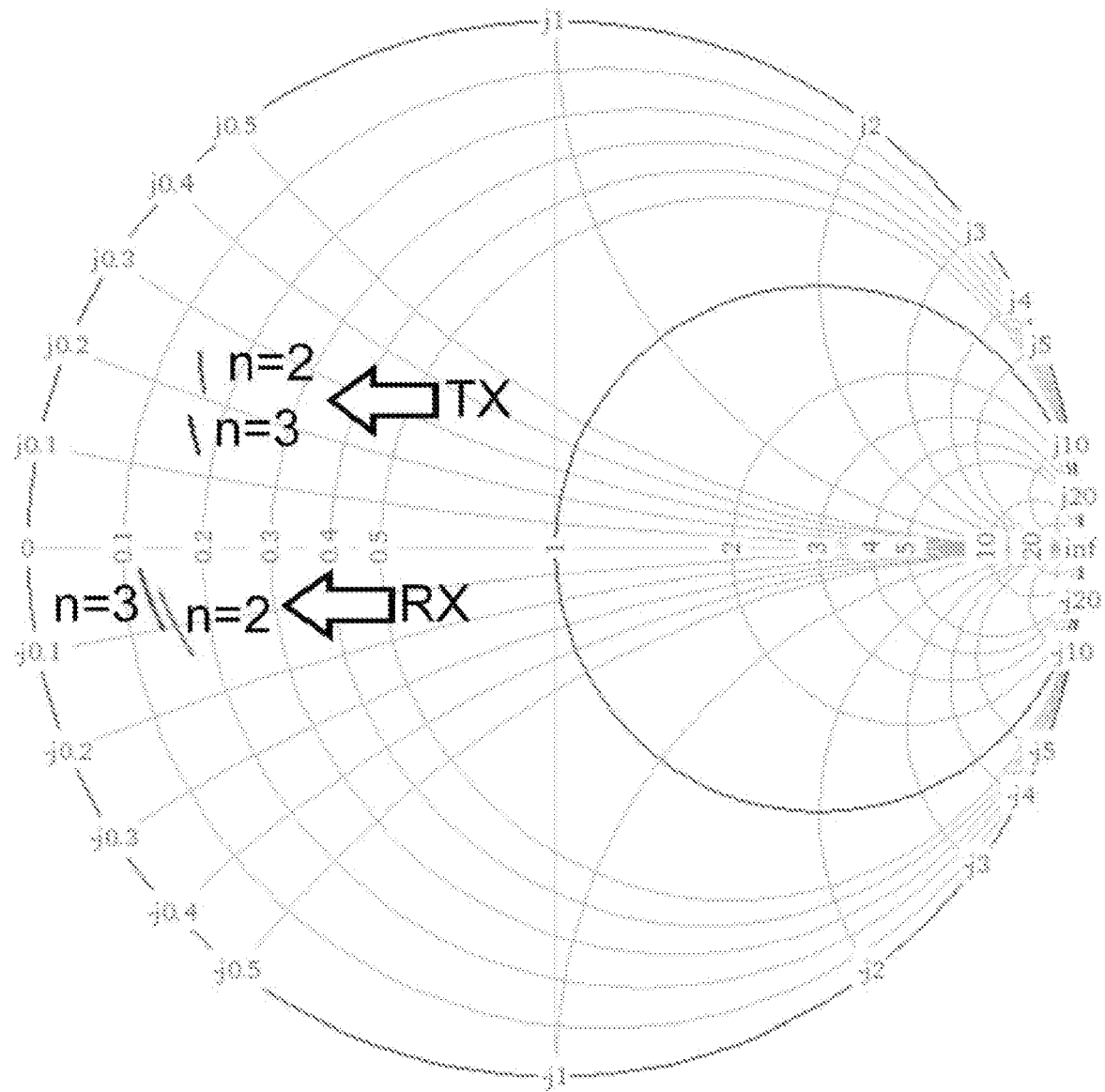
FIG. 6 illustrates a Smith chart showing the RX impedance and the TX impedance in the system of FIG. 5.

FIG. 6 illustrates the RX input impedance and TX output impedance when 2 or 3 parallel bondwires are used for the TX output, where the inductance of one bondwire is assumed to be 2 nH. FIG. 6 illustrates how the RX input impedance becomes closer to the TX output impedance as more parallel bondwires are used for the TX output. The RX input impedance will also move closer to the TX output impedance if the bondwire inductance is made larger. Further, if the RX bondwire is made longer and/or TX bondwires are made shorter, the impedance of RX will be even closer to that of TX.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for minimizing a difference between a transmitter impedance and a receiver impedance in a wireless communication transceiver, the method comprising:

interconnecting a receiver connection from a transceiver with a package pin of a chip with a receiver bondwire; and interconnecting a transmitter connection from the transceiver to the package pin of the chip with a plurality of transmitter bondwires, each of the transmitter bondwires disposed in parallel with each other.

2. The method of claim 1, wherein the plurality of transmitter bondwires is at least two transmitter bondwires.

3. The method of claim 1, wherein the chip is free of inductors used for impedance matching.

4. The method of claim 1, further comprising decreasing an inductance of at least one of the plurality of transmitter bondwires to minimize the difference.

5. The method of claim 1, further comprising lengthening the receiver bondwire to minimize the difference.

6. The method of claim 1, further comprising shortening at least one of the plurality of transmitter bondwires to minimize the difference.

7. A method for minimizing a difference between a transmitter impedance and a receiver impedance in a wireless communication transceiver, the method comprising:

interconnecting a receiver connection from a transceiver with a package pin of a chip with a receiver bondwire; and interconnecting a transmitter connection from the transceiver to the package pin of the chip with a transmitter bondwire, wherein an inductance of the receiver bondwire is different from an inductance of the transmitter bondwire;

the chip is free of inductors used for impedance matching; and the transmitter bondwire is a plurality of transmitter bondwires connected in parallel with each other.

8. The method of claim 7, wherein:

the receiver bondwire includes one or more receiver bondwires;

a combined inductance of the one or more receiver bondwires is greater than a combined inductance of the plurality of transmitter bondwires.

9. The method of claim 7, wherein:

the receiver bondwire includes one or more receiver bondwires;

a combined inductance of the one or more receiver bondwires is less than a combined inductance of the plurality of transmitter bondwires.

10. The method of claim 7, wherein the plurality of transmitter bondwires is at least two transmitter bondwires.

11. The method of claim 7, further comprising lengthening the receiver bondwire to minimize the difference.

12. The method of claim 7, further comprising shortening at least one of the plurality of transmitter bondwires to minimize the difference.

13. A method for improving a performance of a receiver and a transmitter of a transceiver in a wireless communication device, the method comprising:

reducing a difference in a transmitter impedance and a receiver impedance by:

interconnecting a receiver connection from the transceiver with a package pin of a chip with a receiver bondwire; and interconnecting a transmitter connection from the transceiver to the package pin of the chip with a plurality of transmitter bondwires, connected in parallel, wherein an inductance of the receiver bondwire is different from an inductance of the plurality of transmitter bondwires; and the chip is free of inductors used for impedance matching.

14. The method of claim 13, wherein:

the receiver bondwire includes one or more receiver bondwires;

a combined inductance of the one or more receiver bondwires is greater than a combined inductance of the plurality of transmitter bondwires.

15. The method of claim 13, wherein:

the receiver bondwire includes one or more receiver bondwires;

a combined inductance of the one or more receiver bondwires is less than a combined inductance of the plurality of transmitter bondwires.

16. The method of claim 13, wherein the plurality of transmitter bondwires is at least two transmitter bondwires.

17. The method of claim 13, further comprising lengthening the receiver bondwire to minimize the difference.

18. The method of claim 13, further comprising shortening at least one of the plurality of transmitter bondwires to minimize the difference.

\* \* \* \* \*